United States Patent
Cabodi et al.

(10) Patent No.: US 11,964,900 B2
(45) Date of Patent: Apr. 23, 2024

(54) TUCKSTONE

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Pierrick Vespa, Aix-en-Provence (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 976 days.

(21) Appl. No.: 16/771,313

(22) PCT Filed: Dec. 19, 2018

(86) PCT No.: PCT/EP2018/085976
§ 371 (c)(1),
(2) Date: Jun. 10, 2020

(87) PCT Pub. No.: WO2019/122005
PCT Pub. Date: Jun. 27, 2019

(65) Prior Publication Data
US 2020/0339462 A1    Oct. 29, 2020

(30) Foreign Application Priority Data
Dec. 21, 2017   (FR) ...................................... 1762834

(51) Int. Cl.
*C03B 5/43*     (2006.01)
*C04B 35/119*   (2006.01)
*C04B 35/488*   (2006.01)

(52) U.S. Cl.
CPC .............. *C03B 5/43* (2013.01); *C04B 35/119* (2013.01); *C04B 35/4885* (2013.01);
(Continued)

(58) Field of Classification Search
None
See application file for complete search history.

(56) References Cited

U.S. PATENT DOCUMENTS

2014/0196504 A1* 7/2014 Cabodi ................... C03B 5/43
                                                      65/374.13

FOREIGN PATENT DOCUMENTS

| CN | 201463561 U   | 5/2010 |                   |
|----|---------------|--------|-------------------|
| CN | 106927664 A * | 7/2017 | ............ C03B 5/43 |

(Continued)

OTHER PUBLICATIONS

CN-106927664-A Clarivate Analytics Machine Translation Retrieved Aug. 18, 2023. (Year: 2023).*

(Continued)

*Primary Examiner* — Lisa L Herring
(74) *Attorney, Agent, or Firm* — Ronald M. Kachmarik; Cooper Legal Group LLC (57) ABSTRACT

Fused tuckstone defining lower and upper surfaces. The lower surface includes a support surface to rest on metallic structure of a glass furnace, a tank surface intended to face an upper edge of a tank of the furnace, and a lower transition surface connecting the support and tank surfaces. The upper surface includes a superstructure surface to receive a side wall of a superstructure of the furnace and an upper transition surface connecting the superstructure and lower surfaces. At least a part of the lower transition surface has a crystal density of more than four times the crystal density at a depth of 4 centimeters below the lower transition surface, a crystal density being evaluated by the number of crystals having a surface area of more than 12 $\mu m^2$ per $mm^2$ of surface after polishing, the crystal density at the depth being evaluated after cutting of the tuckstone.

20 Claims, 2 Drawing Sheets

(52) U.S. Cl.
CPC ............. *C04B 2235/3201* (2013.01); *C04B 2235/3217* (2013.01); *C04B 2235/3225* (2013.01); *C04B 2235/3244* (2013.01); *C04B 2235/3409* (2013.01); *C04B 2235/3418* (2013.01); *C04B 2235/775* (2013.01); *C04B 2235/9607* (2013.01)

(56) References Cited

FOREIGN PATENT DOCUMENTS

| | | | |
|---|---|---|---|
| JP | 2012513360 | A | 6/2012 |
| JP | 2013514254 | A | 4/2013 |
| JP | 2013534895 | A | 9/2013 |
| JP | 2015506898 | A | 3/2015 |
| JP | 2017065985 | A | 4/2017 |
| WO | WO-2017115698 | A1 * | 7/2017 |

OTHER PUBLICATIONS

WO-2017115698-A1 Clarivate Analytics Machine Translation Retrieved Aug. 18, 2023. (Year: 2023).*
JP2017-065985A EPO Machine Translation Performed Aug. 18, 2023. (Year: 2023).*
Office Action for Corresponding Japanese Patent Application 2020-533849, dated Aug. 10, 2022, 10 pages.
International Search Report corresponding International application PCT/EP2018/085976 dated Mar. 15, 2019, 3 pages.
Database WPI Week 201037, May 12, 2010, Thomson Scientific, London, GB; AN 2010-F79510, XP002785382.

* cited by examiner

TUCKSTONE

TECHNICAL FIELD

The invention concerns a tuckstone for glass furnaces, and a glass furnace comprising such a tuckstone.

PRIOR ART

Numerous glass products are manufactured by melting and refining a vitrifiable mixture of raw materials comprising compounds such as oxides, carbonates, sulfates and nitrates. The two stages are performed in furnaces, the main constituent elements of which are refractory products able to resist the high temperatures and stresses encountered in these furnaces. Glass furnaces thus generally comprise a very large number of refractory products arranged at different locations depending on their properties. For each part of the furnace, the product selected must be one which does not cause any defects rendering the glass unusable (which would reduce the production yield) and which is sufficiently resistant in the long term to give the furnace a satisfactory service life.

Figures 1, 2A:
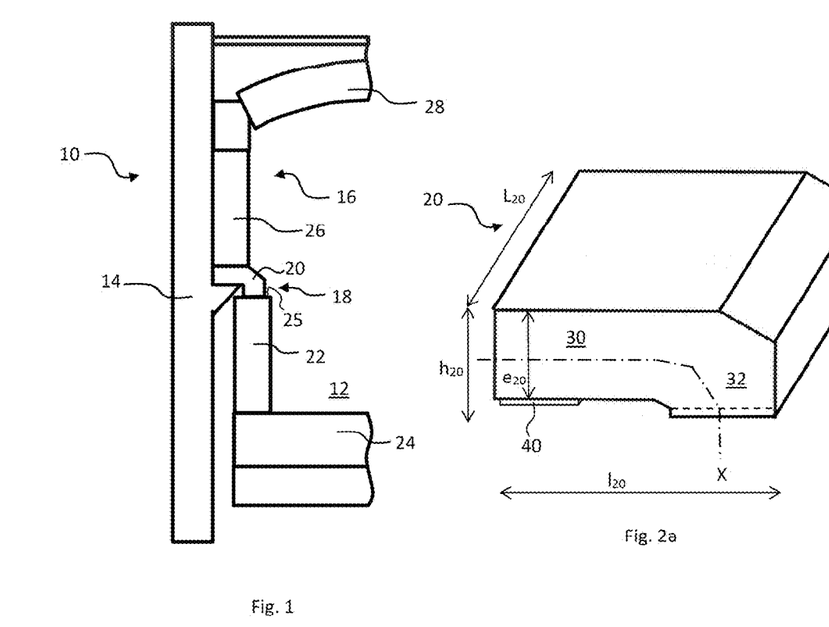

FIG. 1 diagrammatically depicts a half cross-section of a glass furnace 10. In particular, we see a tank 12, a metal structure 14 and a superstructure 16.

The tank 12, intended to contain the molten glass, comprises a vertical side wall 22 and a base plate 24. The side wall 22 is conventionally made of lateral tank blocks which extend over the entire height of the tank up to an upper edge 25.

The superstructure 16, at its base, conventionally comprises an intermediate layer 18 via which it rests on the metallic structure, a side wall 26 resting on the intermediate layer, and an arch 28. Burners (not shown) are arranged in the side wall 26 and operate alternately.

The metallic structure 14, conventionally made of cast iron, externally surrounds the side wall 22 of the tank. It carries the weight of the superstructure 16.

The intermediate layer 18 comprises and is preferably constituted by tuckstones 20 which conventionally have the shape shown in FIG. 2a. Conventionally, each tuckstone 20 has the general form of a profile of L-shaped cross-section. In service, the long arm of the L or "superstructure arm" 30 extends horizontally. The short arm of the L or "tank arm" 32 extends vertically below the superstructure arm 30.

The outer surface of a tuckstone 20 consists of:
first and second end surfaces $20_1$ and $20_2$ respectively, which delimit the length $L_{20}$ of the profile,
a lower surface $20_3$ comprising a horizontal support surface $20_{14}$ which, in service, rests on the metallic structure 14; a tank surface $20_{12}$, preferably horizontal, which, in service, extends facing the upper edge 25 of the tank 12; and a lower transition surface $20_{14-12}$ connecting the support surface $20_{14}$ and the tank surface $20_{12}$,
an outer side surface $20_4$, preferably vertical,
an upper surface $20_5$ comprising a horizontal superstructure surface $20_{26}$ on which the side wall 26 rests in operation, and an upper transition surface $20_{26-3}$ connecting the superstructure surface $20_{26}$ and the lower surface $20_3$, and in particular the tank surface $20_{12}$.

Figure 2B:
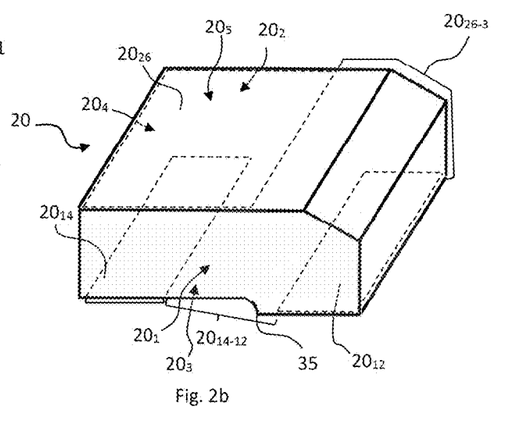

On FIG. 2b, the tank surface $20_{12}$, the support surface $20_{14}$ and the superstructure surface $20_{26}$ are delimited by dotted lines.

The tuckstone 20 must tolerate high thermal stresses since the superstructure arm 30 is partially in an environment at temperatures close to ambient temperature, generally thanks to blown air cooling, while the tank arm 32, partially inside the furnace, is exposed to temperatures of around 1500° C.

Also, the tuckstone undergoes thermal cycles due to alternating operation of the burners and maintenance operations, such as "cladding" operations which require stoppage then restarting of external cooling of the furnace, or operations for changing burners or burner blocks which require stoppage then restarting of the burners.

The tuckstone must also be resistant to corrosion from the aggressive vapors of the furnace and condensates.

In order to resist these stresses, the tuckstone is made of a refractory product.

In refractory products, we distinguish between fused products and sintered products. In contrast to sintered products, fused products most often comprise an intergranular vitreous phase connecting the crystalline grains. The problems posed by sintered products and fused products, and the technical solutions adopted to solve these, are therefore generally different. A composition developed for production of a sintered product is not necessarily usable as such for production of a fused product, and vice versa. Fused products, often described as "electro-fused", are obtained by melting a mixture of appropriate raw materials in an electric arc furnace or using any other technique suitable for these products. The bath of molten material is then cast in a mold, then the resulting product undergoes a controlled cooling cycle.

At present, mainly fused products are used to produce tuckstones, in particular products of the alumina-zirconia-silica type (abbreviated to AZS) containing 30 to 45% zirconia. The microstructure of these products substantially comprises crystals of alpha alumina, crystals of free zirconia, crystals of corundum-zirconia eutectic and an intercrystalline vitreous phase. Also, products with a very high content of zirconia (typically more than 85% zirconia) can be found. The microstructure of these products substantially comprises crystals of free zirconia (dendrites) and an intercrystalline vitreous phase.

Also, to extend the service life of the furnace, the refractory blocks of the furnace must be assembled "dry", i.e. with no jointing mortar. To ensure a seal, the blocks must have very precise dimensions with a good surface condition. The blocks, in particular the tuckstones, are therefore always machined to ensure a close contact with adjacent blocks.

However, the resistance of tuckstones to cracking is sometimes insufficient to meet current developments in the needs of glassmakers, who demand an extended service life of the furnaces.

In fact, cracking of a tuckstone may lead to fracturing, causing debris to fall into the bath of molten glass and thus create defects in the glass. Also, the tuckstone then no longer correctly protects the metallic structure and the tank. The rest of the superstructure may also be unbalanced.

There is therefore a need for a tuckstone having better resistance to cracking and/or an extended service life. One object of the invention is to meet this need.

SUMMARY OF THE INVENTION

The invention concerns a fused tuckstone defining an outer surface as described above.

According to a first main aspect of the invention, at least a part and preferably all of the lower transition surface has a skin microstructure, i.e. a crystal density of more than 4 times, or more than 6 times, or more than 7 times, or more than 9 times the crystal density measured at a depth of 4 centimeters (cm) below said surface.

Surprisingly, the inventors have found that the presence of a skin microstructure at the lower transition surface considerably improves the thermomechanical strength and the corrosion resistance of the tuckstone. The service life of the furnace is thereby advantageously extended.

Preferably, at least a part, preferably the entirety of the surfaces intended to be exposed to the environment inside the furnace has a skin microstructure. In particular, preferably at least a part, preferably the entire tank surface and/or the upper transition surface has a skin microstructure.

Preferably, at least a part, preferably all the support surface, or all the lower surface and/or all or part of the outer side surface, has a skin microstructure.

In one embodiment, the superstructure surface and/or the end surfaces, or the entire surface of the tuckstone may have a skin microstructure.

This embodiment is not however preferred. Preferably, at least the superstructure surface does not have a skin microstructure. Preferably, the end surfaces do not have a skin microstructure.

According to a second main aspect of the invention:
the upper transition surface, at the junction between the superstructure and tank arms, comprises a curved surface, i.e. not flat, with no ridges, and preferably constituting a fraction of a cylindrical surface of circular base. Preferably, this upper junction surface connects a horizontal surface of the superstructure arm, in particular the superstructure surface, and a horizontal surface of the tank arm, in particular the tank surface, and/or
the lower transition surface, at the junction between the superstructure and tank arms, comprises a curved surface with no ridges, and preferably constituting a fraction of a cylindrical surface of circular base. Preferably, this lower junction surface connects a horizontal surface of the superstructure arm, in particular the superstructure surface, and a horizontal surface of the tank arm, in particular the tank surface.

According to a third main aspect of the invention, in any cross-section, the thickness of the tuckstone is constant.

The inventors have found that the absence of ridges and a constant thickness improve the mechanical strength of the tuckstone. The rounded form also allows a better drainage of condensate which may be evacuated with the molten glass in the tank, thus limiting corrosion of the tuckstone.

According to a fourth aspect of the invention, the support surface comprises a single foot or a set of feet, mutually identical or different, each having a terminal face which is preferably flat or coplanar with the end faces of the other feet, and intended to rest on the metallic structure in service.

Preferably, the support surface defines precisely three or four feet.

Preferably, the terminal faces of the feet have no skin microstructure.

Further preferably, an interfacing material fills the volume delimited by the support surface and extending up to the plane of said end faces. When the support surface defines several feet, the interfacing material thus extends between the feet over a thickness substantially equal to the height of the feet.

The area of the terminal face of the single foot or the cumulative sum of the areas of the terminal faces of the feet preferably represents more than 0.5% and less than 10% of the area of the support surface.

Naturally, the various main aspects of the invention may be combined.

Whichever main aspect is concerned, a tuckstone according to the invention may comprise one or more of the following optional characteristics:
the surface with skin microstructure has a crystal density of less than 30 times, or less than 25 times, or less than 20 times the crystal density measured at a depth of 4 centimeters below said surface;
at least a part of the upper transition surface is a surface with skin microstructure;
the entire lower surface is a surface with skin microstructure;
at least a part of the superstructure surface has a crystal density of less than four times, less than three times or less than twice the density at depth of 4 centimeters below said superstructure surface;
the surface with skin microstructure, and in particular at least a part of the lower transition surface, has a crystal density of more than 130 crystals per square millimeter ($mm^2$), preferably more than 150 crystals per $mm^2$, preferably more than 180 crystals per $mm^2$, preferably more than 200 crystals per $mm^2$, more than 230 crystals per $mm^2$, or more than 250 crystals per $mm^2$;
the tuckstone has a $ZrO_2$ content, in mass percentage based on oxides, of more than 80.0%, and the surface with skin microstructure, in particular at least a part of the lower transition surface, has a crystal density of more than 600 crystals per $mm^2$, preferably more than 650 crystals per $mm^2$, preferably more than 700 crystals per $mm^2$, preferably more than 800 crystals per $mm^2$, more than 900 crystals per $mm^2$, more than 1000 crystals per $mm^2$, or more than 1100 crystals per $mm^2$;
the tuckstone has a $ZrO_2$ content, in mass percentage based on oxide, of more than 80.0%, and the mean equivalent diameter of said crystals of the surface with skin microstructure, in particular at least a part of the lower transition surface, is less than 45 µm, preferably less than 40 µm, and/or preferably more than 20 µm, or more than 30 µm;
an interfacing material, preferably in the form of a layer, preferably of thermally insulating material with a thermal conductivity of preferably less than $1.0 \text{ W·m}^{-1}\text{·K}^{-1}$ is arranged, preferably glued, on at least a part of a surface with skin microstructure;
the interfacing material is deformable (under the effect of compression forces encountered in service), preferably a felt, preferably a thermally insulating felt with a thermal conductivity of preferably less than $1.0 \text{ W·m}^{-1}\text{·K}^{-1}$, or less than $0.7 \text{ W·m}^{-1}\text{·K}^{-1}$, or less than $0.5 \text{ W·m}^{-1}\text{·K}^{-1}$, preferably of ceramic fibers, in particular based on alumina and silica;
the end surfaces are flat and in particular have no cranks, and are preferably substantially vertical;
in another embodiment, the first and second end surfaces, which respectively define a tenon and a mortise of shape complementary to said tenon, such that in the service position, said tenon is housed in a mortise of a first adjacent tuckstone and said mortise receives a tenon of a second adjacent tuckstone (male/female coupling);
the tuckstone has a chemical composition in mass percentage based on oxides such that:
$Al_2O_3+ZrO_2+SiO_2>80.0\%$;
the tuckstone has a chemical composition comprising, in mass percentage based on oxides, more than 0.5% and less than 10.0% of a zirconia stabilizer;
the tuckstone has a chemical composition in mass percentage based on oxides such that, for a total of 100%:

$Al_2O_3+ZrO_2+SiO_2$: more than 84.0% and less than 97.0%, $Y_2O_3$: less than 5.0%, $Na_2O$: more than 0.1% and less than 1.5%, $B_2O_3$: more than 0.1% and less than 0.6%, oxide types other than $Al_2O_3$, $ZrO_2$, $SiO_2$, $Y_2O_3$, $Na_2O$ and $B_2O_3$: less than 10.0%;

the tuckstone has a chemical composition in mass percentage based on oxides such that:

$ZrO_2$: more than 12.0% and less than 45.0%, $SiO_2$: more than 8.0% and less than 24.0%, $Al_2O_3$: more than 35.0% and less than 60.0%, or such that $ZrO_2$: more than 80.0% and less than 97.0%, $SiO_2$: more than 0.5% and less than 15.0%, $Al_2O_3$: more than 0.2% and less than 3.0%.

Obtaining a skin microstructure on the surface of a fused tuckstone, i.e. in a fused product, poses no particular difficulty to the person skilled in the art. In particular, the person skilled in the art knows that a microstructure may be given a finer surface by increasing the rate of solidification of the molten material.

When the bath of molten material is cast in the mold, the properties of the mold and the temperature of the mold may in particular be adapted to ensure cooling which is sufficiently rapid to obtain a skin microstructure. For example, when the mold is initially at ambient temperature, a skin microstructure forms on the surface in contact with or in the vicinity of the mold walls. If, in contrast to normal practice, this skin is not eliminated during a machining operation, a skin microstructure is obtained on the surfaces of the tuckstone which have not been machined.

Limited machining (surfacing) however allows a skin microstructure to be retained.

In a particular embodiment, the invention concerns a method for production of a tuckstone, the method comprising the following successive steps:

a) mixing of raw materials so as to form a starting batch;

b) fusion of said starting batch to obtain a bath of molten material;

c) casting of said molten material in a mold, preferably at ambient temperature, and solidification of said molten material by cooling so as to obtain an intermediate piece which has the general form of a tuckstone, and the surface of which in contact with the mold has a skin microstructure;

d) removal of said intermediate piece from the mold;

e) partial machining of the outer surface of the intermediate piece so as to retain at least a part of the surface with skin microstructure.

Preferably, the superstructure surface or the end surfaces are machined, which gives good stability in the furnace. In one embodiment, the support surface is not machined, and/or the tank surface is not machined.

The invention also concerns a tuckstone produced or able to have been produced using a method according to the invention.

The invention furthermore concerns a method for production of a furnace comprising a glass melting tank, a superstructure extending above the tank, and a metallic structure supporting the superstructure, said method comprising the integration of a tuckstone according to the invention, preferably produced following steps a) to d), preferably following steps a) to e), in an intermediate layer between the metallic structure and a side wall of the superstructure, the support and superstructure surfaces being in contact with the metallic structure and the side wall of the superstructure respectively, and the tank surface facing an upper edge of the tank.

The invention finally concerns a glass furnace comprising:

a tank with an upper edge;

a metallic structure; and a superstructure with an intermediate layer comprising a tuckstone according to the invention, the support surface resting on the metallic structure, the tank surface extending facing the upper edge of the tank, and the superstructure resting on the superstructure surface.

Definitions

A transverse plane is a plane perpendicular to the direction of the length. The median transverse plane is the transverse plane passing at half length.

The terms "lower" and "upper", "inner" and "outer", "horizontal" and "vertical" refer to the orientations or positions when the tuckstone is in its service position in a glass furnace.

The terms "horizontal" and "vertical" mean an orientation forming, with a perfectly horizontal and vertical plane respectively, an angle of less than 5°, less than 2°, or less than 1°.

The "crystal density" is determined by counting the crystals visible on a plate obtained by microscopy of the surface concerned after polishing said surface with a diamond grid up to grade 1 micron. Each crystal is delimited by the vitreous phase. Only the crystals with a surface area of more than 12 square microns are counted. To verify whether a surface of a tuckstone has a skin microstructure, the visible crystals are counted on a plate of this surface after being polished, then the tuckstone is cut to a depth of 4 cm below the surface, and the visible crystals are counted on a plate of the surface thus exposed after being polished.

The term "skin" conventionally means the peripheral region of a fused block formed from the molten material which was less than 5 millimeters (mm) from the wall of the mold during solidification.

If a part "supports", "rests on", or "is in contact with" and other part, the two parts are resting one on the other. The contact between these parts may be direct or indirect. An "indirect contact" means that the two parts are separated by an intermediate element, preferably an interfacing material, under the effect of this support, for example a felt.

The tank surface is the surface which, in the service position, "faces" the upper edge of the tank, i.e. extends substantially parallel to this edge above and in the immediate vicinity of this edge. The tank surface is thus defined by the set of points on the outer surface which are at a minimum distance from the edge of the tank. The tank surface, preferably horizontal, does not therefore extend towards the outside of the tank beyond the crank 35 at the junction between the arms of the tank and the superstructure. The crank 35 may in particular define a ridge with a right angle.

The term "machining" means a grinding operation via which the surface of a refractory part is machined in order to obtain a precise surface geometry. Conventionally, and in a particular embodiment of the invention, the machining leads to removal of at least the skin.

With the view to clarity, the chemical formulae of the oxides are used to designate the content of these oxides in a composition. For example, "$ZrO_2$", "$SiO_2$" or "$Al_2O_3$" designate the contents of these oxides, and "zirconia", "silica" and "alumina" are used to designate the phases of these oxides formed from $ZrO_2$, $SiO_2$ and $Al_2O_3$ respectively.

Unless specified otherwise, all oxide contents in a tuckstone according to the invention are mass percentages based on oxides. A mass content of an oxide of a metallic element relates to the total content of this element expressed in the form of the most stable oxide, in accordance with the usual convention of the industry.

In a fused product, the oxides conventionally represent more than 95%, more than 97%, more than 99% and preferably substantially 100% of the mass.

$HfO_2$ cannot be chemically separated from $ZrO_2$. However, according to the present invention, $HfO_2$ is not added voluntarily. $HfO_2$ therefore designates only the traces of hafnium oxide, wherein this oxide is always naturally present in the sources of zirconia with mass contents generally less than 5%, generally less than 2%. In a tuckstone according to the invention, the mass content of $HfO_2$ is preferably less than 5%, preferably less than 3%, preferably less than 2%. With a view to clarity, we can designate the total content of zirconia oxide and traces of hafnium oxide as either "$ZrO_2$" or "$ZrO_2+HfO_2$". $HfO_2$ is not therefore included in the "oxide types other than $ZrO_2$, $SiO_2$, $Al_2O_3$, $Na_2O$, $B_2O_3$ and $Y_2O_3$".

BRIEF DESCRIPTION OF THE FIGURES

Further characteristics and advantages of the invention will appear from reading the detailed description below and from examining the appended drawings in which:

FIG. 1 diagrammatically depicts a half cross-section through a glass furnace;

FIGS. 2 (2a, 2b, 2c and 2d) is a diagrammatic, perspective view of an exemplary tuckstone according to the invention. The form shown is also the usual shape of conventional tuckstones;

FIG. 3 (3a and 3b) is a diagrammatic, perspective view of an exemplary tuckstone of a glass furnace in a preferred embodiment of the invention.

DETAILED DESCRIPTION

Since FIG. 1 has been described in the introduction, we will now refer to FIG. 2a, partially described in the introduction.

The length $L_{20}$ of the tuckstone 20 is preferably more than 10 cm and preferably less than 100 cm. Its width $l_{20}$ is preferably more than 30 cm and/or less than 100 cm and its height $h_{20}$ is preferably more than 10 cm and/or less than 50 cm.

In a cross-sectional plane, i.e. perpendicular to the direction of the length $L_{20}$, the "axis X" is the line which extends halfway between the upper surface $20_5$ and the lower surface $20_3$.

The thickness $e_{20}$ of the tuckstone, at a point on axis X contained in the median transverse plane, is the smallest dimension measured perpendicularly to axis X at this point. Preferably, the mean thickness of the tuckstone along axis X is more than 10 cm and/or less than 50 cm. Preferably, this thickness is constant along axis X.

Preferably, the tuckstone is a profile such that its dimensions in a transverse plane are independent of the cross-sectional plane concerned.

Preferably, the support surface $20_{14}$ has a skin microstructure. In a preferred embodiment, the entire lower surface $20_3$, and/or all or part of the upper transition surface $20_{26-3}$, preferably at least the non-horizontal part of the upper transition surface $20_{26-3}$, and/or the outer side surface $20_4$ of the tuckstone has/have a skin microstructure. In this way, the cracking resistance and machining time are improved.

When the skin microstructure is obtained by rapid cooling resulting from coming into contact with the surface of a mold, the surface of the tuckstone with this microstructure may have geometric variations which are prejudicial to the dry assembly of the tuckstone 20 with the side wall 26 of the superstructure or with a metallic structure.

In one embodiment, the interfacing material 40 is arranged against at least a part of the surface with skin microstructure. The interfacing material 40 is configured to accommodate two surfaces intended to be in mutual contact, and/or to thermally isolate them from each other.

The interfacing material may be a deformable material in order to compensate for the geometric variations of the surfaces.

The interfacing material may be a thermally insulating material with a thermal conductivity of preferably less than 1.0 $W \cdot m^{-1} \cdot K^{-1}$, less than 0.7 $W \cdot m^{-1} \cdot K^{-1}$, or less than 0.5 $W \cdot m^{-1} \cdot K^{-1}$.

The interfacing material is preferably a felt, preferably a thermally insulating felt, preferably made of ceramic fibers, in particular based on alumina and silica.

The interfacing material may be arranged over all or part of the surface with a skin microstructure, in particular on contact surfaces which, in the absence of deformable material, would be directly in contact with another piece.

The thermally insulating and/or deformable interfacing material preferably takes the form of a layer, the thickness of which is preferably less than 40 mm, preferably less than 32 mm, preferably less than 28 mm, preferably less than 22 mm or/or preferably more than 3 mm, or more than 5 mm.

Further preferably, the interfacing material is fixed to the surface with skin microstructure, preferably by gluing. On FIG. 2a, it is glued onto the support surface which has a skin microstructure. The interfacing material advantageously stabilizes the assembly of the two parts it separates, despite any dimensional variations resulting from the absence of machining.

In one embodiment, the surface with skin microstructure is locally structured in order to improve the fixing of the interfacing material 40, in particular in the case of a deformable material. For example, one or more circular grooves, closed in themselves, may be provided in order to create one or more attachment zones.

In one embodiment, the interfacing material extends over the entire lower surface.

Preferably, the interfacing material does not extend over surfaces which do not have a skin microstructure.

Figure 2C:
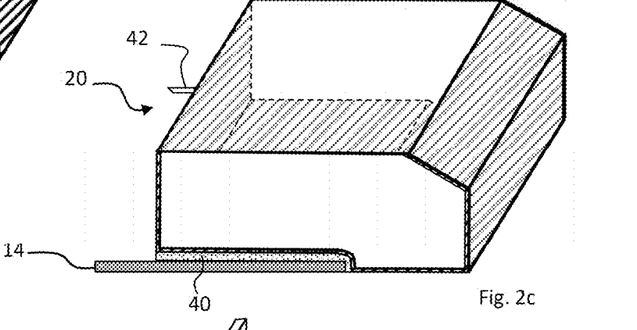
Figure 3A:
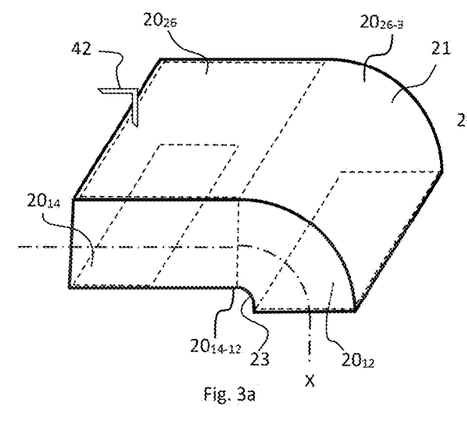
Figure 3B:
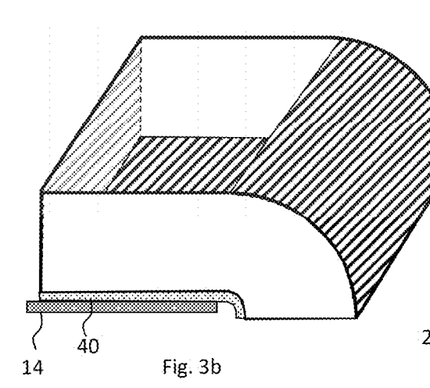

In a preferred embodiment illustrated on FIG. 2c or 3b:
the entire lower surface $20_3$ (support surface $20_{14}$, tank surface $20_{12}$, and lower transition surface $20_{14-12}$ connecting the support surface $20_{14}$ and the tank surface $20_{12}$),
the entire outer side surface $20_4$, and
the part of the upper transition surface $20_{26-3}$ which is not horizontal,
have a skin microstructure (hatched area on FIGS. 2c and 3b). The interfacing material extends, preferably exclusively, over the entire support surface $20_{14}$ and over the part of the lower transition surface $20_{14-12}$ which is not horizontal (FIGS. 2c and 3b).

Figure 2D:
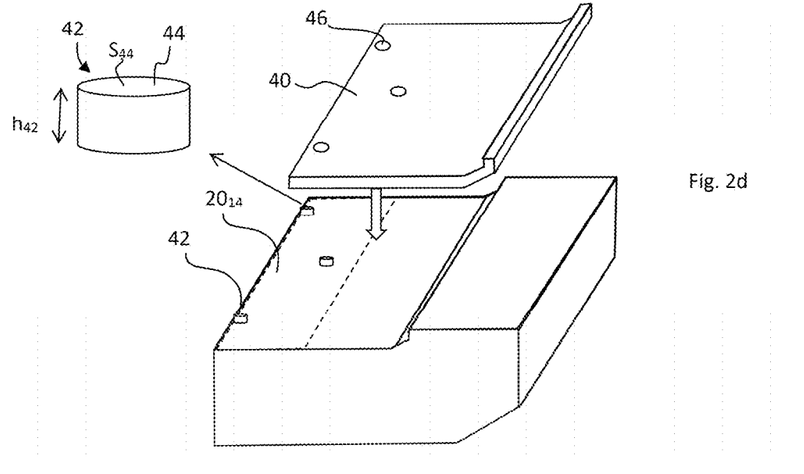

In an embodiment illustrated on FIG. 2d, the support surface $20_{14}$, i.e. the surface which extends facing the metallic structure in the service position, comprises one or more, preferably two to four feet 42, the end faces 44 of which are flat and coplanar. The height $h_{42}$ of the feet is preferably more than 1 mm, preferably more than 2 mm, and/or less than 2 cm, preferably less than 1 cm, preferably less than 8 mm, preferably less than 5 mm.

The end faces of the feet define surfaces via which the tuckstone rests on the metallic structure. Machining these allows the tuckstone to be installed with perfect accommodation of the surfaces, which allows precise positioning of the tuckstone.

In a preferred embodiment, the end faces of the feet have no skin microstructure. The rest of the support surface $20_{14}$ and/or the rest of the surface of the feet may however have a skin microstructure.

Preferably, in the service position, an interfacing material 40 fills the space between the tuckstone and the metallic structure. In other words, the interfacing material 40 extends between the feet. It may take the form of a layer, for example a nonwoven matting pierced by holes 46 adapted to the shape of the feet. Advantageously, the feet thus help hold the interfacing material 40 in position.

In an embodiment, the support surface $20_{14}$ is not machined, with the exception of the end faces 44. The machining operation is thereby advantageously substantially accelerated.

The total sum of the areas $S_{44}$ of the end faces of the feet, or the area of the end face of the foot when the support surface defines a single foot, preferably represents more than 0.5%, preferably more than 1%, more than 2%, and/or less than 10%, preferably less than 8%, preferably less than 5% of the area of the support surface $20_{14}$. In one embodiment, each end face has a surface area of less than 10 cm$^2$, less than 5 cm$^2$, less than 3 cm$^2$.

Preferably, the feet are not aligned, which improves the stability of the tuckstone.

The shape of the feet is not limitative. In particular, they may be cylindrical, preferably with a circular base (as shown), but also conical or parallelepipedic. The feet do not necessarily all have the same shape.

In one embodiment, at least one or each foot extends along the entire length of the tuckstone.

Preferably, the shape of the feet has no region with an undercut.

In one embodiment, a mold is used which has a precisely determined geometry, for example a mold made by three-dimensional printing.

Preferably, the tuckstone according to the invention comprises, preferably is constituted by an electro-fused material comprising, to more than 80% of its mass, alumina, zirconia, silica and in some cases a zirconia stabilizer, in particular yttrium oxide. The material may be of the AZS type or have a very high zirconia content (typically comprising more than 80% $ZrO_2$ in mass percentage).

In one embodiment, the tuckstone according the invention comprises more than 0.5%, more than 1.5%, more than 3.0%, more than 4.0%, more than 5.0%, or more than 6.0%, and/or less than 10.0%, less than 9.0%, or less than 8.0% zirconia stabilizer, in particular CaO and/or $Y_2O_3$ and/or MgO and/or $CeO_2$, preferably $Y_2O_3$ and/or CaO, preferably $Y_2O_3$.

Preferably, the tuckstone according to the invention has a chemical composition, in mass percentage based on oxides, such that for a total of 100%, $Al_2O_3+ZrO_2+SiO_2$: more than 80.0%, preferably more than 84.0%, preferably more than 86.0%, and/or less than 97.0%, or less than 95.0%, or less than 94.0%, and/or $Y_2O_3$: more than 0.5%, more than 1.5%, more than 2.0% and/or less than 5.0%, less than 4.0%, or less than 3.0%, and/or $Na_2O$: more than 0.1%, more than 0.2%, and/or less than 0.6%, preferably less than 0.5%, or less than 0.4%, and/or $B_2O_3$: more than 0.1%, or more than 0.2%, and/or less than 0.6%, preferably less than 0.5%, or less than 0.4%, and/or oxide types other than $Al_2O_3$, $ZrO_2$, $SiO_2$, $Y_2O_3$, $Na_2O$ and $B_2O_3$: less than 10.0%, preferably less than 9.0%, further preferably less than 8.0%, less than 5.0%, or less than 3.0%, or less than 2.0%, or less than 1.0%, or less than 0.5%.

According to one embodiment, the tuckstone according to the invention has a chemical composition such that:

$ZrO_2$: more than 12.0%, preferably more than 15.0%, preferably more than 18.0%, or more than 22.0%, and/or less than 45.0%, or less than 40.0%, or less than 35.0%, or less than 30.0%, or less than 25.0%, and/or $SiO_2$: more than 8.0%, preferably more than 10.0%, preferably more than 12.0%, and/or less than 24.0%, or less than 20.0%, less than 17.0%, or less than 14.0%, and/or $Al_2O_3$: more than 35.0%, preferably more than 38.0%, or more than 40.0%, and/or less than 60.0%, preferably less than 55.0%, or less than 50.0%, less than 46.0%, or less than 44.0%.

According to one embodiment, the tuckstone according to the invention has a chemical composition such that:

$ZrO_2$: more than 80.0%, preferably more than 83.0%, preferably more than 86.0%, and/or less than 97.0%, or less than 95.0%, or less than 94.0%, and/or $SiO_2$: more than 0.5%, preferably more than 1.5%, preferably more than 2.5%, preferably more than 4.0%, or more than 6.0%, more than 8.0%, more than 8.5%, and/or less than 15.0%, or less than 12.0%, less than 10.0%, or less than 8.0%, and/or $Al_2O_3$: more than 0.2%, preferably more than 1.0%, and/or less than 3.0%, preferably less than 2.0%.

According to one embodiment, the tuckstone has a device 42 for anchoring in the metallic envelope of the glass furnace. This anchoring device comprises for example a screw, a hook, a metallic plate or notch. This anchoring device is preferably fixed at less than 20 cm, preferably less than 10 cm, preferably less than 5 cm from the superstructure surface (FIG. 2c), or fixed to the superstructure surface (FIG. 3a).

Naturally, the dimensions and shapes described above are not limitative.

FIG. 3 shows a diagrammatic, perspective view of a preferred shape of a tuckstone according to the invention.

In the junction part between the superstructure and tank arms, the upper transition surface $20_{26-3}$ defines an upper junction surface 21 with no ridge, which preferably constitutes a fraction of a circular cylindrical base that preferably (as shown) extends angularly over 90° (quarter of a cylinder body) and preferably connects two respective horizontal surfaces of these arms.

Preferably, in the junction part between the superstructure and tank arms, the lower transition surface $20_{14-12}$ defines a lower junction surface 23 with no ridge, which preferably comprises or constitutes a fraction of a circular cylindrical base that preferably (as shown) extends angularly over 90°, preferably connecting two respective horizontal surfaces of these arms. In one embodiment, this cylinder fraction is substantially coaxial to the cylinder fraction of the upper transition surface.

The use of three-dimensional printing to produce a mold allows easier production of surfaces without ridges, in particular the upper transition surface and/or the lower transition surface, and in particular cylinder fractions of these transition surfaces. The mechanical strength of the tuckstone is thereby improved.

In a preferred embodiment, as shown on FIG. 3, the thickness of the tuckstone is constant along axis X.

Examples

To reproduce the stresses suffered by tuckstones in service, specimens of dimensions 150×100×85 mm³ were arranged in a furnace, a first large face (called the "hot face") being close to the heating means, and the opposite, second large surface (called the "cold face") being against the door of the furnace when closed.

The temperature of the heating means was increased at the rate of 30° C. per hour until 1350° C. was reached on the hot face. This temperature was maintained throughout the test.

The furnace door was then open periodically to cause a variation in the temperature of the cold face between 600° C. and 1000° C. over 3 cycles of 3 hours (door opened for 1.5 hours, door closed for 1.5 hours), then the temperature was maintained at 600° C. for 15 hours. This treatment was repeated for 5 consecutive days.

The performance of the specimens was evaluated by measuring the dynamic Young's modulus or "MOE" before and after the test. The MOE was determined by measuring the rate of propagation of ultrasound in the specimen using an Ultrasonic Tester IP8 from the company Ultratest, used in flat mode. The initial MOE, measured at 20° C., is marked "MOE ini", the residual MOE after the test is marked "MOE res" and the loss of MOE ("MOE res"−"MOE ini")/"MOE initial" is marked "ΔMOE" in table 1.

The microstructures of the products could be analyzed and characterized using an optical microscope of the type Richert Polyvar 2, preferably using a magnification of ×5, coupled with ImageJ image analysis software. The image analysis software allows isolation of independent crystals (i.e. surrounded by the vitreous phase) and determination of their surface area. In particular, it is possible to distinguish crystals of free zirconia or alumina-zirconia eutectic. Only crystals with a surface area of more than 12 square microns were counted.

The numbers of crystals (Nc) per mm² of surface of the cold face (Nc-surface) and on a surface situated 4 cm inside the specimen (Nc-internal) were counted. The given values correspond to the means over 4 readings. The ratio between Nc-surface and Nc-internal was calculated. A ratio of more than 4, or more than 7, is representative of a skin microstructure.

Specimen no. 1 is a reference specimen machined on all faces and consisting of AZS ER1681 material sold by the company SEFPRO.

Specimen no. 2 is a reference specimen machined on all faces and consisting of ER1195 material sold by the company SEFPRO.

Specimen no. 3 is a specimen machined on all faces with the exception of the cold face and consisting of ER1195 material sold by the company SEFPRO.

Specimen no. 4 is a reference specimen machined on all faces with the exception of the cold face and consisting of ER1681 material sold by the company SEFPRO.

To measure the corrosion resistance, cylindrical bars of 22 mm diameter and 100 mm height were cut from the specimens and subjected to a test consisting of rotating the bars immersed in a bath of alkali-lime glass. The rotation speed of the specimens was 6 rotations per minute. For examples 2 and 3, the glass was brought to 1550° C. and the test lasted for 72 hours. For example 4, the glass was brought to 1500° C. and the test lasted for 48 hours. At the end of the test, the remaining volume of the corroded specimen for each bar was evaluated. The remaining volume of the reference product (example 1 present in each test) was selected as the comparison basis. The ratio of the remaining volume of any other corroded bar to the remaining volume of the reference corroded bar, multiplied by 100, corresponds to the corrosion index (Ic) and gives an evaluation of the corrosion resistance of the tested specimen relative to that of the reference product. Thus scores of more than 100 represent a smaller corrosion loss than that of the reference product. The products concerned therefore have a better resistance to corrosion by the molten glass than the reference specimen.

Also, the thermomechanical strength of the specimens at temperature, at 500° C., was evaluated using the MOR/MOE ratio. The force at rupture (MOR) and the MOE were then measured on a specimen of dimensions 15×25×150 cm³. The 3-point flexion mounting was produced to ISO NF EN 843 standard using a Shimadzu press with a distance of 125 mm between the two lower supports. Rubbers were placed on the punches to avoid the initiation of cracks. The punch descent speed was constant at 5 mm per minute.

The results are given in table 1:

|  | 1 | 2 | 3 | 4 |
|---|---|---|---|---|
| Nc-surface (for 1 mm²) | 30 | 77 | 1135 | 229 |
| Nc-internal (for 1 mm²) | 29 | 43 | 65 | 29 |
| Nc-surface/ Nc-internal (for 1 mm²) | 1.0 | 1.8 | 17.5 | 7.9 |
| MOE ini (GPa) | 147 | 196 | 182 | ND |
| MOE res (GPa) | 57 | 122 | 148 | ND |
| ΔMOE (%) | 61 | 38 | 19 | ND |
| Ic | 100 | 158 | 179 | 118 |
| MOR/MOE @ 500° C. | $0.48 \times 10^{-3}$ | $0.58 \times 10^{-3}$ | $0.72 \times 10^{-3}$ | $0.77 \times 10^{-3}$ |

The examples show that a skin microstructure (high gradient of crystal density at the periphery of the product) leads to a significant improvement in the product stability, since the ΔMOE can be divided by more than 3.

The increase in the MOR/MOE ratio indicates the excellent thermomechanical strength of a tuckstone according to the invention.

It is evident that the embodiments described are merely exemplary and could be modified, in particular by substitution of technical equivalents, without leaving the scope of the invention.

The invention claimed is:
1. Fused tuckstone having a lower surface and an upper surface,
the lower surface comprising:
a support surface intended to rest on a metallic structure of a glass furnace,
a tank surface intended to face an upper edge of a tank of said glass furnace, and a lower transition surface connecting the support surface and the tank surface,
and the upper surface comprising:
a superstructure surface intended to receive a side wall of a superstructure of said glass furnace, and
an upper transition surface connecting the superstructure surface and the lower surface,
said fused tuckstone being characterized in that at least a part of the lower transition surface has a crystal density of more than four times the crystal density at a depth of 4 centimeters below said lower transition surface, such a surface being described as a surface with "skin microstructure", a crystal density being evaluated by the number of crystals having a surface area of more than 12 µm² per mm² of surface after polishing, the crystal density at said depth being evaluated over the surface exposed after cutting of the fused tuckstone to said depth.

2. Fused tuckstone according to claim 1, wherein at least a part of the upper transition surface is a surface having a crystal density of more than four times the crystal density at a depth of 4 centimeters below said upper transition surface.

3. Fused tuckstone according to claim 1, wherein the entire lower surface is a surface having a crystal density of more than four times the crystal density at a depth of 4 centimeters below said entire lower surface.

4. Fused tuckstone according to claim 1, wherein at least a part of the superstructure surface has a crystal density of less than four times the density at depth of 4 centimeters below said superstructure surface.

5. Fused tuckstone according to claim 1, wherein a layer of an interfacing material, which is deformable and/or has a thermal conductivity of less than 1.0 W·m⁻¹·K⁻¹, is arranged on at least a part of a surface with skin microstructure.

6. Fused tuckstone according to claim 1, having a chemical composition in mass percentage based on oxides such that:

$Al_2O_3+ZrO_2+SiO_2>80.0\%$.

7. Fused tuckstone according to claim 1, comprising, in mass percentage based on oxides, more than 0.5% and less than 10.0% of a zirconia stabilizer.

8. Fused tuckstone according to claim 1, having a chemical composition in mass percentage based on oxides such that, for a total of 100%:
$Al_2O_3+ZrO_2+SiO_2$ is greater than 83.8% and less than 97.0%,
$Y_2O_3$ is greater than 0.5% and less than 5.0%,
$Na_2O$ is greater than 0.1% and less than 0.6%,
$B_2O_3$: more is greater than 0.1% and less than 0.6%, and
the amount of oxide types other than $Al_2O_3$, $ZrO_2$, $SiO_2$, $Y_2O_3$, $Na_2O$ and $B_2O_3$ is less than 10.0%.

9. Fused tuckstone according to claim 1, having a chemical composition in mass percentage based on oxides such that:
$ZrO_2$ is greater than 12.0% and less than 45.0%,
$SiO_2$ is greater than 8.0% and less than 24.0%, and
$Al_2O_3$ is greater than 35.0% and less than 60.0%.

10. Fused tuckstone according to claim 1, having a chemical composition in mass percentage based on oxides such that:
$ZrO_2$ is greater than 80.0% and less than 97.0%,
$SiO_2$ is greater than 0.5% and less than 15.0%, and
$Al_2O_3$ is greater than 0.2% and less than 3.0%.

11. Fused tuckstone according to claim 10, wherein said at least one part of the lower transition surface has a crystal density of more than 650 crystals per mm².

12. Fused tuckstone according to claim 10, wherein the mean equivalent diameter of the crystals of said at least one part of the lower transition surface is less than 45 µm.

13. Fused tuckstone according to claim 1, wherein the support surface defines a single foot or a set of feet, each foot having a terminal face intended to rest during use on the metallic structure, said terminal face not having a crystal densit of more than four times the crystal density at a depth of 4 centimeters below said terminal face.

14. Fused tuckstone according to claim 13, wherein the area of the terminal face of the single foot or the cumulative sum of the areas ($S_{44}$) of the terminal faces of the feet represents more than 0.5% and less than 10% of the area of the support surface.

15. Fused tuckstone according to claim 13, wherein a layer of an interfacing material which is deformable and/or had a thermal conductivity of less than 1.0 W·m⁻¹·K⁻¹, is arranged on at least a part of the surface with skin microstructure, and wherein the interfacing material fills the volume which is delimited by the support surface and which extends up to the plane of said terminal face or faces.

16. Fused tuckstone according to claim 1, wherein
the upper transition surface, at the junction between the superstructure and tank arms, comprises a curved upper junction surface with no ridges, which connects a horizontal surface of the superstructure arm and a horizontal surface of the tank arm, and/or
the lower transition surface, at the junction between the superstructure and tank arms, comprises a curved lower junction surface with no ridges, which connects a horizontal surface of the superstructure arm and a horizontal surface of the tank arm.

17. Glass furnace comprising:
a superstructure with an intermediate layer comprising a fused tuckstone according to claim 1;
a tank with an upper edge; and
a metallic structure,
wherein the support surface of the fused tuckstone rests on the metallic structure, the tank surface of the fused tuckstone extends facing the upper edge of the tank, and the superstructure rests on the superstructure surface of the fused tuckstone.

18. Method for production of a fused tuckstone according to claim 1, the method comprising the following successive steps:
a) mixing of raw materials so as to form a starting batch;
b) fusion of said starting batch to obtain a bath of molten material;
c) casting of said molten material in a mold, and solidification of said molten material by cooling so as to obtain an intermediate piece which has a form of a tuckstone, the surface of said intermediate piece which is in contact with the mold having a crystal density of more than four times the crystal density at a depth of 4 centimeters below said surface;
d) removal of said intermediate piece from the mold; and
e) partial machining of the outer surface of the intermediate piece to obtain said fused tuckstone.

19. Method according to claim 18, wherein in step e), the superstructure surface is machined and/or the support surface is not machined, and/or the tank surface is not machined.

20. Method for production of a furnace, said furnace comprising a glass melting tank, a superstructure extending above the glass melting tank, and a metallic structure supporting the superstructure, said method comprising integrating a fused tuckstone according to claim 1 as part of an intermediate layer of the superstructure between the metallic structure and a side wall of the superstructure,
  wherein the support surface and superstructure surface of the fused tuckstone contact the metallic structure and the side wall of the superstructure respectively, and the tank surface of the fused tuckstone faces an upper edge of the glass melting tank.

* * * * *